US012776857B2

(12) United States Patent
Sun et al.

(10) Patent No.: US 12,776,857 B2
(45) Date of Patent: Oct. 27, 2026

(54) PUNCTURING IN SEGMENT PROCESSING

(71) Applicant: Nokia Technologies Oy, Espoo (FI)

(72) Inventors: Jing Yuan Sun, Beijing (CN); Mads Lauridsen, Aalborg (DK); Tzu-Chung Hsieh, Naperville, IL (US); Frank Frederiksen, Aalborg (DK); Gilsoo Lee, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 220 days.

(21) Appl. No.: 18/728,134

(22) PCT Filed: Jan. 11, 2022

(86) PCT No.: PCT/CN2022/071467
§ 371 (c)(1),
(2) Date: Jul. 11, 2024

(87) PCT Pub. No.: WO2023/133709
PCT Pub. Date: Jul. 20, 2023

(65) Prior Publication Data
US 2025/0096934 A1 Mar. 20, 2025

(51) Int. Cl.
*H04L 1/00* (2006.01)
*H04L 27/26* (2006.01)
*H04W 84/06* (2009.01)

(52) U.S. Cl.
CPC ...... *H04L 1/0069* (2013.01); *H04L 27/26025* (2021.01); *H04W 84/06* (2013.01)

(58) Field of Classification Search
CPC ... H04L 1/0013; H04L 1/0067; H04L 1/0068; H04L 1/0069; H04L 5/0007; H04L 27/26025; H04W 84/06
See application file for complete search history.

(56) References Cited

U.S. PATENT DOCUMENTS

| | | | | |
|---|---|---|---|---|
| 11,309,997 B2 * | 4/2022 | Xu | H03M 13/618 |
| 2006/0036929 A1 * | 2/2006 | Yoon | H04L 1/0043 714/774 |

(Continued)

FOREIGN PATENT DOCUMENTS

| | | |
|---|---|---|
| CN | 110958081 A | 4/2020 |
| WO | 2009/131162 A1 | 10/2009 |
| WO | 2021/180203 A1 | 9/2021 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211, V16.7.0, Sep. 2021, pp. 1-249.

(Continued)

*Primary Examiner* — Jeong S Park
(74) *Attorney, Agent, or Firm* — Barta Jones, PLLC

(57) ABSTRACT

Embodiments of the present disclosure relate to devices, methods, apparatuses and computer-readable storage medium for symbol puncturing in segment processing. In some example embodiments, a first determines a puncturing pattern for one or more segments for performing puncturing, the puncturing pattern indicating at least one segment of the one or more segments to be punctured. The first device further performs puncturing on the one or more segments based on the puncturing pattern and transmits the one or more segments to the second device.

20 Claims, 6 Drawing Sheets

(56) References Cited

U.S. PATENT DOCUMENTS

| | | | | |
|---|---|---|---|---|
| 2006/0087961 | A1* | 4/2006 | Chang | H04L 27/2607 370/210 |
| 2010/0111022 | A1* | 5/2010 | Chang | H04W 72/541 370/329 |
| 2013/0315264 | A1* | 11/2013 | Srinivasa | H04L 27/00 370/474 |
| 2019/0281614 | A1 | 9/2019 | Chen et al. | |
| 2019/0296769 | A1* | 9/2019 | Zhang | H03M 13/2707 |
| 2020/0083983 | A1* | 3/2020 | Chen | H04L 1/0042 |
| 2023/0209567 | A1* | 6/2023 | Grossmann | H04L 5/0044 370/329 |

OTHER PUBLICATIONS

"3rd Generation Partnership Project; Technical Specification Group Radio Access Network; Evolved Universal Terrestrial Radio Access (E-UTRA); Physical layer procedures (Release 16)", 3GPP TS 36.213, V16.7.1, Oct. 2021, pp. 1-578.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.7.0, Dec. 2021, pp. 1-1092.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

"New Study WID on NB-IoT/eTMC support for NTN", 3GPP TSG RAN Meeting #86, RP-193235, MediaTek Inc., Dec. 9-31, 2019, 4 pages.

"WID on NB-IoT/eMTC support for NTN", 3GPP TSG RAN Meeting #92-e, RP-211601, Agenda: 10.5.1, MediaTek Inc., Jun. 14-18, 2021, 6 pages.

"Solutions for NR to support non-terrestrial networks (NTN)", 3GPP TSG RAN meeting #90-e, RP-202908, Agenda: 9.8.6, Thales, Dec. 7-11, 2020, 10 pages.

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.6.0, Jun. 2020, 3731 pages.

"3rd Generation Partnership Project; Technical Specification Group Radio Access Network; NR; Physical channels and modulation (Release 16)", 3GPP TS 38.211, V16.7.0, Sep. 2021, pp. 1-134.

"3rd Generation Partnership Project; Technical Specification Group Radio Access Network; NR; Physical layer procedures for data (Release 16)", 3GPP TS 38.214, V16.7.0, Sep. 2021, pp. 1-172.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

International Search Report and Written Opinion received for corresponding Patent Cooperation Treaty Application No. PCT/CN2022/071467, dated Oct. 10, 2022, 9 pages.

"Discussion on the synchronization for IoT-NTN", 3GPP TSG RAN WG1 #106e, R1-2107779, Agenda: 8.15.1, ZTE, Aug. 16-27, 2021, 11 pages.

"Remaining issues of time and frequency synchronization for NBIoT/eMTC over NTN", 3GPP TSG RAN WG1 #108, R1-2201587, Agenda: 8.14.1, Nokia, Feb. 21-Mar. 3, 2022, 8 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)", 3GPP TS 36.300 V17.7.0, Mar. 2024, pp. 1-403.

Extended European Search Report received for corresponding European Patent Application No. 22919375.0, dated Dec. 17, 2025, 10 pages.

Office action received for corresponding Indian Patent Application No. 202417041954, dated Jun. 1, 2026, 8 pages.

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763 V17.0.0, Jun. 2021, pp. 1-73.

* cited by examiner

PUNCTURING IN SEGMENT PROCESSING

RELATED APPLICATION

This application claims priority to PCT Patent Application No. PCT/CN2022/071467, filed Jan. 11, 2022, which is incorporated herein by reference in its entirety.

TECHNICAL FIELD

Embodiments of the present disclosure generally relate to the field of telecommunication, and in particular, to devices, methods, apparatuses and computer-readable storage media for puncturing in segment processing.

BACKGROUND

With development of communication technology, more and more communication scenarios may relate to a non-terrestrial network (NTN) in which terminal devices may connect to a core network (CN) via satellites or drones. Currently, support for a narrow band Internet of Thing (NB-IoT)/Long Term Evolution (LTE)/enhanced Machine Type Communication (eMTC) over NTN has been agreed. Compared with terrestrial communication network, NTN has some different communication characteristics. For example, a Low Earth Orbit (LEO) satellite has a speed 7.56 km/s relative to the earth. The distance between a terminal device, such as IoT device, user equipment or eMTC device, and the NTN device, such as a satellite, may change rapidly when the terminal device accesses the data network via the satellite. In this case, NTN may require higher capabilities of timing processing. Further, the timing advance processing of the terminal device is a key aspect.

SUMMARY

In general, example embodiments of the present disclosure provide devices, methods, apparatuses and computer-readable storage media for puncturing in segment processing.

In a first aspect, there is provided a first device. The first device comprises at least one processor and at least one memory including computer program code. The at least one memory and the computer program code configured to, with the at least one processor, cause the first device to determine a puncturing pattern for one or more segments to be transmitted, the puncturing pattern indicating at least one segment of the one or more segments for performing puncturing. The first device is further caused to perform puncturing on the one or more segments based on the puncturing pattern and transmit the one or more segments to the second device.

In a second aspect, there is provided a second device. The second device comprises at least one processor and at least one memory including computer program code. The at least one memory and the computer program code configured to, with the at least one processor, cause the second device to receive one or more segments from a first device. The second device is further caused to determine a puncturing pattern used by the first device for puncturing at least one segment of the one or more segments; and decode the one or more segments based on the puncturing pattern.

In a third aspect, there is provided a method implemented in a first device. In the method, the first device determines a puncturing pattern for one or more segments to be transmitted, the puncturing pattern indicating at least one segment of the one or more segments for performing puncturing. The first device further performs puncturing on the one or more segments based on the puncturing pattern and transmits the one or more segments to the second device.

In a fourth aspect, there is provided a method implemented in a second device. In the method, the second device receives one or more segments from a first device. The second device further determines a puncturing pattern used by the first device for puncturing at least one segment of the one or more segments and decodes the one or more segments based on the puncturing pattern.

In a fifth aspect, there is provided an apparatus comprising means for performing the method according to any of the third to fourth aspects.

In an sixth aspect, there is provided computer-readable storage medium having instructions stored thereon. The instructions, when executed on at least one processor, cause the least one processor to perform the method to any of the third to fourth aspects.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
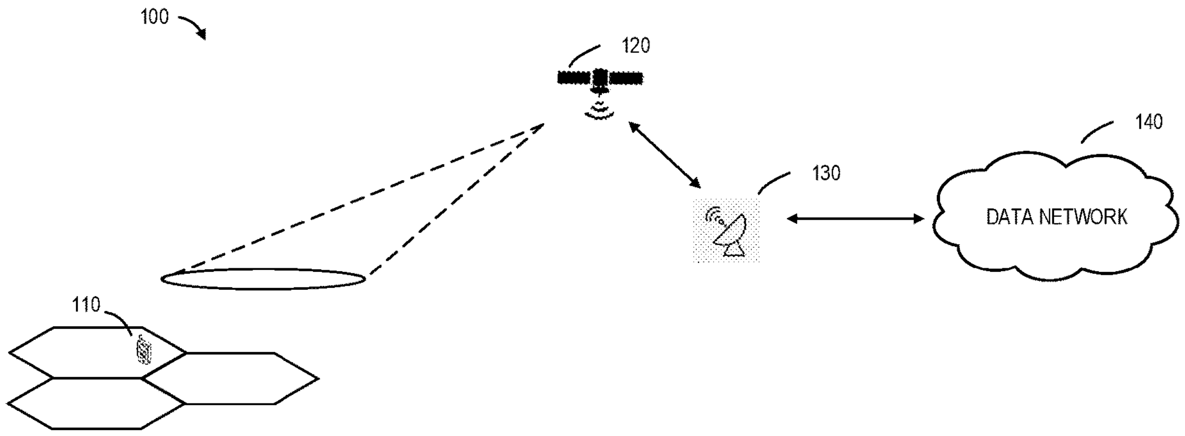
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term “first device” refers to any device having wireless or wired communication capabilities. Examples of the first device include, but not limited to, terminal device, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, devices for Integrated Access and Backhaul (IAB), or image capture devices such as digital cameras, gaming devices, music storage and playback appliances, or Internet appliances enabling wireless or wired Internet access and browsing and the like. Herein, the term "terminal device" can be used interchangeably with a UE.

As used herein, the term "second device" refers to a device which is capable of providing or hosting a cell or coverage where a second device, for example a terminal device, can communicate with. Examples of a second device include, but not limited to, a network device, a Node B (NodeB or NB), an Evolved NodeB (eNodeB or eNB), a next generation eNB (ng-eNB), a ng-eNB-Central Unit (ng-eNB-CU), a ng-eNB-Distributed Unit (ng-eNB-DU), a next generation NodeB (gNB), a gNB-Central Unit (gNB-CU), a gNB-Distributed Unit (gNB-DU), a Remote Radio Unit (RRU), a radio head (RH), a remote radio head (RRH), an Integrated Access and Backhaul (IAB) node, a low power node such as a femto node, a pico node, and the like. In some communication systems, the second device may be consist of multiple separate entities, for example, in NTN system, the second device may be consist of radio frequency part located in satellites or drones, and inter-frequency/base band part located in ground stations.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the singular forms "a", "an" and "the" are intended to include the plural forms as well, unless the context clearly indicates otherwise. The term 'includes' and its variants are to be read as open terms that mean "includes, but is not limited to". The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects.

In communication employing, for example, OFDM technology, in order to ensure UL synchronization, a terminal device may adjust Timing Advance (TA) of data transmission with repetitions. Conventionally, the terminal device may perform the TA processing by adjusting the transmission time of the first symbol in one repetition of the data transmission with repetitions. In the terrestrial network, the distance between the terminal devices and the network device changes slowly compared to the NTN, therefore, adjusting the transmission time of the first symbol in one repetition of the data transmission with repetitions is enough to ensure the UL synchronization. However, as mentioned above, NTN may require higher capabilities of timing processing. With the rapid change of the distance between the terminal device and the network device in the NTN, in order to ensure UL synchronization, the terminal device may need to adjust the transmission time of a plurality of symbols in the data transmission with repetitions. It has been agreed that the data transmission with repetitions are divided into a plurality of segments and the terminal device processes the TA per segment. However, when TA is increasing due to the satellite movement, there may be an overlap between two segments when TA is adjusted for segment. Puncturing one symbol or some sampling may be one way to avoid the overlap of the segments. However, when OFDM symbol/sample is/are punctured of a segment, the repetition number of the punctured symbol will be reduced, leading to the loss of combining gain for that symbol in the repeated PUSCH transmission. The more times a symbol is punctured, the higher the loss for that punctured symbol compared to other repeated symbols in the PUSCH. When one symbol is punctured, then the received signal for this symbol will have higher error probability than other symbols of the PUSCH and the overall performance of PUSCH will be degraded. This may further cause a failure in decoding process at network device side.

Example embodiments of the present disclosure provide a scheme for symbol puncturing in segment processing. In NTN, repetitions of PUSCH or PRACH to be transmitted are divided into a plurality of segment, and the repetitions may be processed based on the segment. In this scheme, a terminal device determines a puncturing pattern for one or more segments to be transmitted. The puncturing pattern indicates at least one segment of the one or more segments to be punctured. The puncturing pattern may be a predefined puncturing pattern of a plurality of predefined puncturing patterns or at least a part of the puncturing pattern is received from the network. The terminal device further performs puncturing on the one or more segments based on the puncturing pattern and transmits the one or more segments to a network device. Then, the network device determines the puncturing pattern used by the first device for puncturing at least one segment of the one or more segments being punctured and decodes the one or more segments based on the determined puncturing pattern.

In this way, the symbol being punctured in segment processing may be flexibly indicated or predefined, such that the punctured symbol may be switched between segments of the data transmission with repetitions. As such, the difference between the repetition gains of the different symbols will be decreased, in order to ensure the performance of the decoding process.

The embodiments of disclosure are mainly discussed with reference to the term "puncture/puncturing/punctured". Moreover, the embodiments of disclosure may be used for all the processing like "drop" or "puncture" or any related processing when symbol is not transmitted.

FIG. 1 illustrates an example environment 100 in which example embodiments of the present disclosure can be implemented.

The environment 100, which may be a part of a communication network, comprises three devices, referred to as a first device 110 (for example, a UE) and a second device 120 (for example, a satellite) and a ground station 130 (the second device 120 and ground station may collectively referred as network devices in NTN), respectively. In some examples, the second device may be a ground station while the satellite is performing amplifying and forwarding. In some examples, the second device 120 may be comprised in a satellite or a ground station. The first device 110 may access to data network 140 via the network device, such as the second device 120 and the ground station 130. In this example, the second device 120 operates as a RAN device. In some embodiments, the second device 120 may be a drone or other aviation devices and other aerospace devices. In some embodiments, the functionalities of the RAN device may also be arbitrarily divided between the second device 120 and the ground station 140 as demanded. In one example, the ground station 130 may host the non-NTN infrastructure functionality part of a RAN device, and the satellite 120 may host the RF functionality part of a RAN device. In another example, the ground station 130 may host the functionality part of a Central Unit of a RAN device (for example, a gNB-CU, or a ng-eNB CU), and the second device 120 may host the functionality part of a Distributed Unit of a RAN device (for example, a gNB-DU, or a ng-eNB-DU). In yet another example, the second device 120 may host the whole functionality of a RAN device (for example, a gNB or a ng-eNB).

It is to be understood that the first and second devices 110 and 120 may be implemented by any other suitable devices and in any other suitable structures. For example, in some example embodiments, the first and second devices 210 and 220 may both implemented by terminal devices that can communicate directly from each other, and the ground station 130 may operate as a RAN device.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, NB-IoT, enhanced machine type communication (eMTC), LTE-Machine to Machine (LTE-M) and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

In some embodiments, the number of the devices in the environment 100 is shown for purpose of illustration without any limitation. In some embodiments, the first device 110 performs the TA adjustment in uplink (UL) data transmission to the second device 120 by proposed scheme for the switching of symbol puncturing in segment processing. In some embodiments, the second device 120 performs the adjustment in downlink (DL) data transmission to the first device 110 by proposed scheme for the switching of symbol puncturing in segment processing. For the purpose of the discussion, some embodiments will discussed with reference to UL data transmission.

Figure 2:
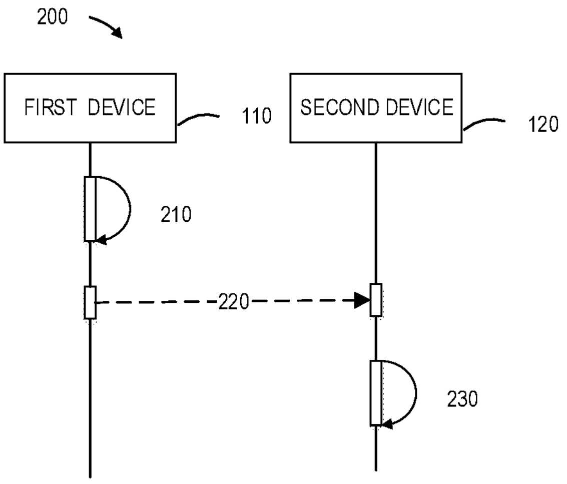
FIG. 2 illustrates a process for switching of symbol puncturing in segment processing according to example embodiments of the present disclosure.

FIG. 2 illustrates a process 200 for puncturing in the segment processing according to some example embodiments of the present disclosure. For purpose of discussion, the process 200 will be described with reference to FIG. 1.

In the process 200, the first device 110 determines (210) a puncturing pattern for one or more segments to be transmitted. The puncturing pattern indicates at least one segment of the one or more segments to be punctured.

In some embodiments, the first device 110 may receive the puncturing pattern from the second device 120 and determine the received puncturing pattern as the puncturing pattern to be used. In addition or alternatively, in some embodiments, at least a part of the puncturing pattern is predefined. For example, the second device 120 may preconfigure at least a part of the puncturing pattern to the first device 110. In this case, the second device 120 may further transmit the different part of the puncturing pattern to the first device 110. Then, based on the preconfigured at least a part of the puncturing pattern and the received different part of the puncturing pattern, the first device 110 may determine the puncturing pattern to be used.

In addition or alternatively, in some embodiments, a plurality of puncturing patterns may be predefined. For example, the second device 120 may preconfigure a plurality of puncturing patterns to the first device 110. In another example, the plurality of puncturing patterns may be hard-coded in the first device 110 based on the agreed specification. In this case, the second device 120 may transmit an indication of activation of a predefined puncturing pattern of the plurality of preconfigured puncturing patterns. Then, the first device 110 may determine this predefined puncturing pattern being activated as the puncturing pattern to be used.

In some embodiments, a part of all the segments to be transmitted is required to be punctured to adjust the TA. The determined puncturing pattern indicates at least one segment of the one or more segments to be punctured. For example, the first device 120 may transmit the first segment of the one or more segments without puncturing any symbol in the first segment, since the UL synchronization is fulfilled at first. However, with the distance between the first device 110 and the second device 120 being changed rapidly, the TAs of the second segment to be transmitted and the following segments should be adjusted (for example, by puncturing symbols in these segments) to fulfill the UL synchronization. The puncturing pattern may indicate at least one segment of the one or more segments to be punctured.

Then, the first device 110 performs (210) puncturing on the one or more segments based on the determined puncturing pattern. In some embodiments, the symbols, samples of a symbol, samples of a cyclic prefix of a symbol and/or a cyclic prefix of a symbol with different indexes are punctured in different segments of the at least one segments.

For the sake of discussion more clearly, the puncturing at least one of one or more segments will be discussed with reference to FIG. 3.

Figure 3:
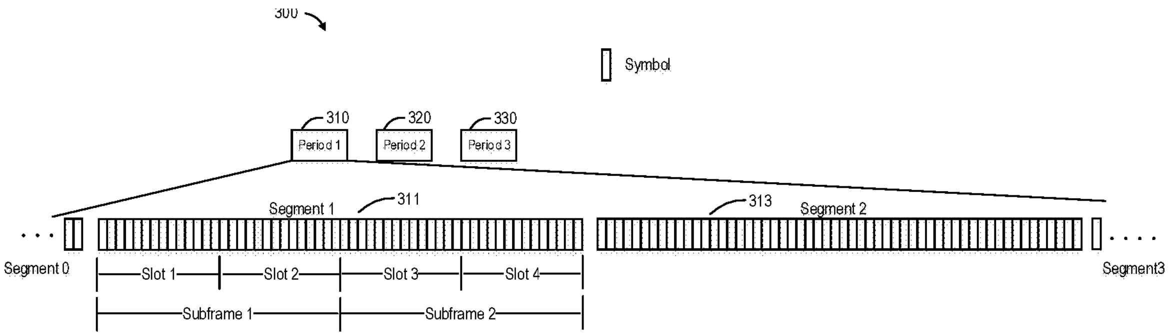
FIG. 3 illustrates an example segment structure in accordance with some example embodiments of the present disclosure.

FIG. 3 illustrates an example segment structure 300 in accordance with some example embodiments of the present disclosure.

In repetitions of UL transmission, the repetitions will be divided into several periods, e.g. 256 ms per period, and there could be UL gap between two adjacent periods. In the segment structure 300, a Period 1 (labeled as Period 310) is divided into a plurality of segments including, for example, Segment 0, Segment 1 (labeled as a segment 311), Segment 2 (labeled as a segment 313) and Segment 3. A Period 2 and a Period 3 (labelled as period 320 and period 330, respectively) may be divided in the similar way. For example, the periods 320 and 330 may also be divided into several segments. In this example, the segment 311 may comprise two subframes, labelled as Subframe 1 and Subframe 2 respectively. Further, each subframe of Subframe 1 and 2 comprises two slots, labelled as Slot 1, Slot 2, Slot 3 and Slot 4, respectively. Specifically, Subframe 1 comprises Slot 1 and Slot 2 and Subframe 2 comprises Slot 3 and Slot 4. Moreover, each slot comprises 14 symbols.

It is to be understood that the number of periods, segments, subframes, slots or symbols are shown only for illustration.

With the determined puncturing pattern, the first device 110 may perform puncturing on the one or more segment in any of the periods 310, 320 and 330.

In some embodiments, the puncturing pattern comprise information identifying the segments for performing the puncturing, and based on the puncturing pattern, the first device 110 may puncture the symbol as identified by the puncturing pattern. In some embodiments, the punctured symbol is symbol other than the symbols used for demodulate reference signal (DMRS) in each subframe of the indicated at least one segment.

In some embodiments, the puncturing pattern may further indicate one or more symbols, a number of samples of a symbol or a number of samples of a cyclic prefix of a symbol, to be punctured in a segment of the at least one segment. In this embodiment, the puncturing pattern indicates the time unit to be punctured. In some embodiments, if the puncturing pattern indicates a number of samples, the first device 110 may puncture samples of the cyclic prefix of a symbol in each segment of the indicated at least one segment. In addition or alternatively, if the puncturing pattern indicates one or more symbols, the puncturing pattern may puncture one or more symbols in each segment of the indicated at least one segment.

In some embodiments, the puncture pattern comprises information identifying one or more symbols to be punctured in a segment of the at least one segment. For example, the puncture pattern may comprise an array [0, 1, 2, 4, 5, 6]. The location of the element in the array corresponds to the segment index. In this example, the terminal device 110 may puncture the first symbol "symbol 0" in the Segment 0, puncture the second symbol "symbol 1" in the Segment 1 311, and puncture the second symbol "symbol 2" in the Segment 2 313 and so on.

In some embodiments, the symbols used for DMRS signal are predefined to be remained. For example, the fourth symbol "symbol 3" in a segment is configured for the DMRS signal. Therefore, no element in the array is "3". For the Segment 3, the terminal device 110 may puncture the fifth symbol "symbol 4".

In addition or alternatively, for the segments which have the segment index larger than the number of elements in the array, the terminal device 110 may puncture the segments by calculating the formulator "index mode number of elements". For example, for the Segment 7, the terminal device calculates "7 mode 6=1", the terminal device 110 then punctures the symbol 0 in the Segment 7, which is correspond to the first element in the array. In this way, the punctured symbol or at least a part of the symbol is switched between the segments.

In some embodiments, the puncture pattern further indicates a subframe, a slot or a resource unit to be punctured in a segment of the at least one segment. For example, the puncturing pattern may further indicate a subframe index in at least one segment of the one or more segments to be punctured. For example, the puncturing pattern may comprise an array [{0,0}; {0,1}; {0,2}; {0,4}; {0, 5}; {0,6}]. In this example, similarly, the location of data cell {X, Y} correspond to the segment index, and the X corresponds to the subframe index, and Y correspond to the symbol index in the subframe X. In some embodiments, the puncturing pattern may comprise a data cell for identifying slot in the array. In some embodiments, the puncturing pattern may comprise other data cell identifying any other resource unit in the array.

In some embodiments, the puncture pattern may further indicate a certain part of the symbols in the segment. For example, the puncturing pattern may indicate the part of symbols associated with parity bits. In this example, assuming that the following indexes of symbol in a segment are associated with the parity bits: 9, 10, 11, 12 and 13, the puncture pattern may comprise an array [9, 10, 11, 12, 13]. In this case, the terminal device 110 may similarly calculate: the index of segment mode the number elements in the array. For the Segment 1 311, the terminal device calculate the index of segment (1) mode the number elements (5) as "1". Then the terminal device 110 may puncture the symbol 10 in the Segment 1 311. In this way, the punctured symbols may be switched between the redundancy symbols in the segment. As such, the symbols carrying information may be remained. In addition or alternatively, this puncturing pattern may also comprise data cell identifying slot, subframe or other resource unit.

In some embodiments, the puncturing pattern may further comprise information identifying a frame, a subframe, a slot or a resource unit to start the puncturing in the at least one segment. For example, with the change of distance between the first device 110 and the second device 120, the Slot 1 may not be required to be punctured. However, the Slot 3 may be required to be punctured.

In addition or alternatively, the puncturing pattern may further comprise information identifying a segment to start the puncturing in the at least one segment. Similarly, with the change of distance between the first device 110 and the second device 120, the Segment 0 may not be required to be punctured. However, the Segment 1 311 may be required to be punctured.

In some embodiments, the first device 110 may not puncture a symbol after starting the puncturing. Instead, the first device 110 may only puncture samples of the cyclic prefix of the symbol or not puncture any samples at all. Whether puncturing symbols/samples depends on the second device 120 movement relative to the first device 110 and the segment duration.

Table 1 provides an example, where the segment configuration (given in the first column) defines whether the first device 110 punctures/drops a complete symbol or not. When a '1' is signalled the first device 110 punctures the next symbol in the ascending order, i.e. first symbol 0, then symbol 1 and so forth. The symbols are still continuous within the subframe, but that the order of symbols is changed, when the first symbol of the subframe is not transmitted (not necessarily being symbol 0). When a '0' is signalled the first device 110 may not puncture the complete symbol 0, but only some samples in the cyclic prefix of the symbol. The '0' may also indicate that the first device 110 may not puncture any samples at all. Depending on the number of available bits, this could also be indicated using a separate value ('2').

TABLE 1

| Segment configuration defining if a symbol is punctured in the segment | Original symbol positions 0 | 1 | 2 | 3 | 4 | Situations |
|---|---|---|---|---|---|---|
| 1 | Puncture | 1 | 2 | 3 | 4 | Symbol 0 is punctured |
| 1 | Puncture | 0 | 2 | 3 | 4 | Symbol 1 is punctured |
| 0 | 0 - CP | 1 | 2 | 3 | 4 | CP of symbol 0 is adjusted |
| 1 | Puncture | 0 | 1 | 3 | 4 | Symbol 2 is punctured |
| 0 | 0 | 1 | 2 | 3 | 4 | No symbols punctured |
| 1 | Puncture | 0 | 1 | 2 | 4 | Symbol 3 is punctured |

Returning back to FIG. 2, the second device 120 determines (230) the puncturing pattern used by the first device for puncturing at least one segment of the one or more segments. As mentioned above, at least a part of the puncturing pattern may be indicated by the second device 120, or the puncturing pattern may be transmitted from the second device 120, or the puncturing pattern may be predefined. The second device 120, therefore, may determine the puncturing pattern by itself.

After the puncturing on the one or more segments based on the puncturing pattern, the first device 110 transmits (220) the one or more segments to the second device 120. In some embodiments, the first device 110 transmits the one or more segments to the second device 120 over the NTN. Further, the second device 120 decodes (230) the one or more segments based on the puncturing pattern.

In addition or alternatively, in some embodiments, three predefined puncturing patterns may also be represented as 'mode index' 0 (a first symbol of segment), 1 (a last symbol of segment), and 2 (no puncturing). Then, when the segment index is n, the mode of symbol puncturing of each segment can be determined by calculating 'n Mod 2'. For example, when the first device 110 is transmitting the 5th segment, the last symbol of the segment is punctured, since 5 Mod 2=1 (i.e., mode index 1 for 5th segment). In this way, both the first device 110 and second device 120 are able to quickly determine/know which symbol within a segment is punctured.

In addition or alternatively, in some embodiments, for the punctured symbol, the pattern could be 0, 1, 2, 4, 5, 6, 7, 8, 9, 11, 12, 13, where it is preferred the symbol for DMRS is not punctured (but it should not be pre-excluded). In this case, when the first device 110 transmits the segment with symbol puncturing, for the 1st segment with symbol puncturing, symbol 0 will be punctured and the first device 110 will transmit symbol 1-13 based on the symbol positions. For the 2nd segment with symbol puncturing, symbol 1 will be punctured and the first device 110 will firstly puncture one symbol transmission and transmit symbol 0 on position of symbol 1 and then symbol 2, 3, . . . 13. For the 3rd segment, with symbol puncturing, a symbol 2 will be punctured and the first device 110 will firstly puncture one symbol transmission and transmit symbol 0 on position of symbol 1 and then symbol 1, 3, . . . 13.

The above embodiments are described in the context of a uplink transmission, for example, PUSCH (NPUSCH). It is to be understood that the above embodiments are also applicable to all uplink transmission, e.g. PUCCH (NPUCCH) and the PRACH (NPRACH). For PUCCH, it will be similar to puncture some symbol or part of CP of symbol as for PUSCH. While for PRACH, all the SC-FDMA symbols carry the same preamble sequence, so there is no need to reordering symbols for puncturing But the starting of puncturing (for example, from which PRACH repetition block, which segment, from which subframe) should also be configured to UE.

As such, no symbol will be degraded significantly because of the times of puncturing for symbols may be balanced, or only symbols with lower priority (less impact on performance, e.g. for parity bits) will be punctured and the performance will not degrade. In addition, the first device 110 and the second device 120 have common understanding which symbol or part of symbol will be punctured and network know how to receive the symbol with one FFT window.

Figure 4:
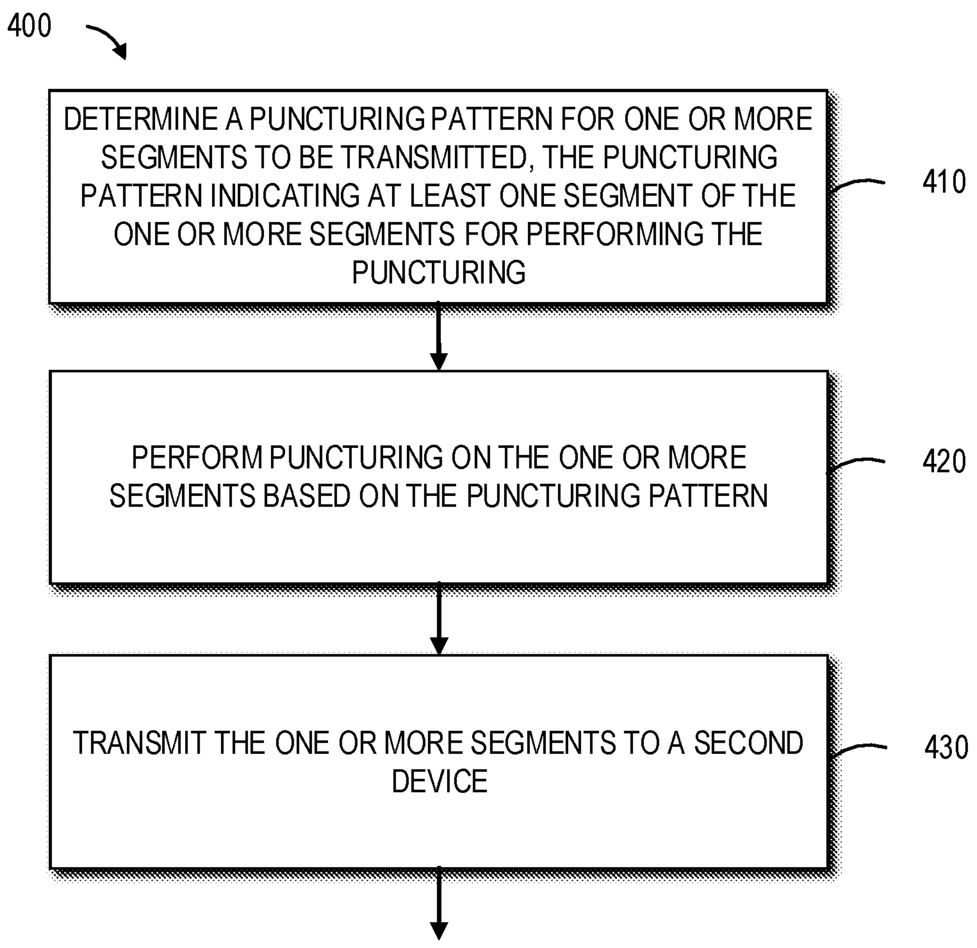
FIG. 4 illustrates an example method implemented in a first device in accordance with some example embodiments of the present disclosure.

FIG. 4 illustrates an example method 400 implemented in a first device in accordance with some example embodiments of the present disclosure.

The method 400 can be implemented at the first device 110 shown in FIG. 1. For the purpose of discussion, the method 400 will be described with reference to FIG. 1. It is to be understood that the method 400 may include additional acts not shown and/or may omit some shown acts, and the scope of the present disclosure is not limited in this regard.

At 410, the first device 110 determines a puncturing pattern for one or more segments to be transmitted, the puncturing pattern indicating at least one segment of the one or more segments to be punctured.

At 420, the first device 110 performs puncturing on the one or more segments based on the puncturing pattern.

At 430, the first device 110 transmits the one or more segments to the second device 120.

In some embodiments, the puncture pattern further indicates at least one of one or more symbols, a number of samples of a symbol, a number of samples of a cyclic prefix of a symbol or a cyclic prefix of a symbol, to be punctured in a segment of the at least one segment.

In some embodiments, the puncture pattern comprises at least one of: information identifying at least one of one or more symbols, a number of samples of a symbol or a number of samples of a cyclic prefix of a symbol or a cyclic prefix of a symbol, to be punctured in a segment of the at least one segment, information identifying a subframe, a slot or a resource unit to be punctured in a segment of the at least one segment, information identifying the at least one segment for performing the puncturing, information identifying a frame, a subframe, a slot or a resource unit to start the puncturing in the at least one segment, information identifying a segment to start the puncturing in the at least one segment, or information identifying a time to start the puncturing.

In some embodiments, symbols, samples of a symbol, samples of a cyclic prefix of a symbol and/or a cyclic prefix of a symbol with different indexes are punctured in different segments of the at least one segments.

In some embodiments, the first device 110 is caused to perform the puncturing on the one or more segments by: puncturing, based on the puncturing pattern, at least a part of a symbol or at least a part of each of one or more symbols of a subframe, a slot or a resource unit in a segment of the at least one segment.

In some embodiments, the puncture pattern further indicates at least one of: puncturing one or more symbols and/or samples associated with parity bits in a segment of the at least one segment; and skipping puncturing of one or more symbols and/or samples used for a demodulation reference signal in a segment of the at least one segment.

In some embodiments, the first device 110 is caused to determine the puncturing pattern by: receiving at least a part of the puncturing pattern from the second device 120 over a Non-Terrestrial network.

In some embodiments, a different part of the puncturing pattern is predefined.

In some embodiments, the first device 110 is caused to determine the puncturing pattern by: receiving, from the second device 120 over a Non-Terrestrial network, an indication of activation of a predefined puncturing pattern of a plurality of predefined puncturing patterns; and determining the predefined puncturing pattern as the puncturing pattern for one or more segments.

Figure 5:
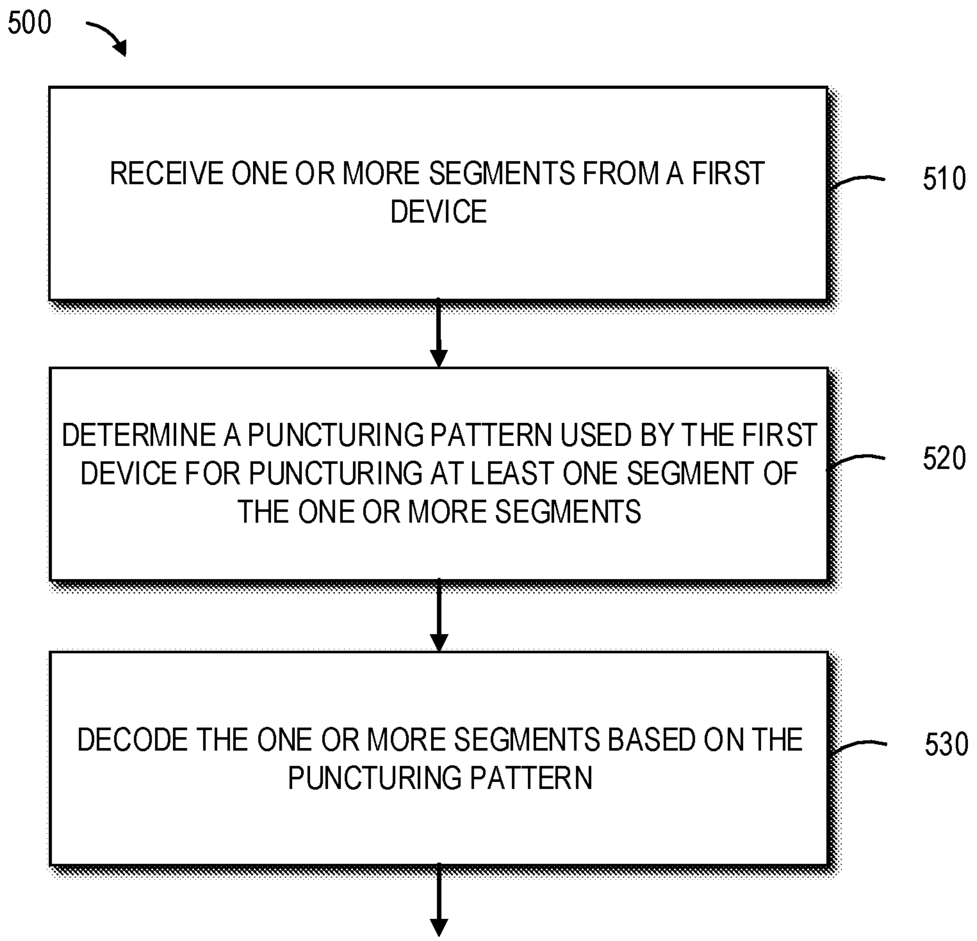
FIG. 5 illustrates an example method implemented in a second in accordance with some example embodiments of the present disclosure.

FIG. 5 illustrates an example method 500 implemented in a second in accordance with some example embodiments of the present disclosure.

The method 500 can be implemented at the second device 120 shown in FIG. 1. For the purpose of discussion, the method 500 will be described with reference to FIG. 1. It is to be understood that the method 500 may include additional acts not shown and/or may omit some shown acts, and the scope of the present disclosure is not limited in this regard.

At 510, the second device 120 receives one or more segments from the first device 10.

At 520, the second device 120 determines a puncturing pattern used by the first device 110 for puncturing at least one segment of the one or more segments. The determining at 520 may be performed before the receiving at 510. For example, the second device 120 may first determine the puncturing pattern and inform the first device what pattern to use, and then receive the one or more segments that are punctured by the first device 110 based on the informed puncturing pattern.

At 530, the second device 120 decodes the one or more segments based on the puncturing pattern.

In some embodiments, the puncture pattern further indicates at least one of one or more symbols, a number of samples of a symbol, a number of samples of a cyclic prefix of a symbol or a cyclic prefix of a symbol, to be punctured in a segment of the at least one segment.

In some embodiments, the puncture pattern comprises at least one of: information identifying at least one of one or more symbols, a number of samples of a symbol or a number of samples of a cyclic prefix of a symbol or a cyclic prefix of a symbol, to be punctured in a segment of the at least one segment, information identifying a subframe, a slot or a resource unit to be punctured in a segment of the at least one segment, information identifying the at least one segment for performing the puncturing, information identifying a frame, a subframe, a slot or a resource unit to start the puncturing in the at least one segment, information identifying a segment to start the puncturing in the at least one segment, or information identifying a time to start the puncturing.

In some embodiments, symbols, samples of a symbol, samples of a cyclic prefix of a symbol and/or a cyclic prefix of a symbol with different indexes are punctured in different segments of the at least one segments.

In some embodiments, the puncture pattern further indicates at least one of: puncturing one or more symbols and/or samples associated with parity bits in a segment of the at least one segment; and skipping puncturing of one or more symbols and/or samples unused for a demodulation reference signal in a segment of the at least one segment.

In some embodiments, the second device 120 is caused to determine the puncturing pattern used by the first device 110 by: transmitting at least a part of the puncturing pattern to the first device 110 over a Non-Terrestrial network.

In some embodiments, a different part of the puncturing pattern is predefined.

In some embodiments, the second device 120 is caused to determine the puncturing pattern used by the first device 110 by: transmitting, to the first device 110 over a Non-Terrestrial network, an indication of activation of a predefined puncturing pattern of a plurality of predefined puncturing patterns; and determining the predefined puncturing pattern as the puncturing pattern used by the first device.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Figure 6:
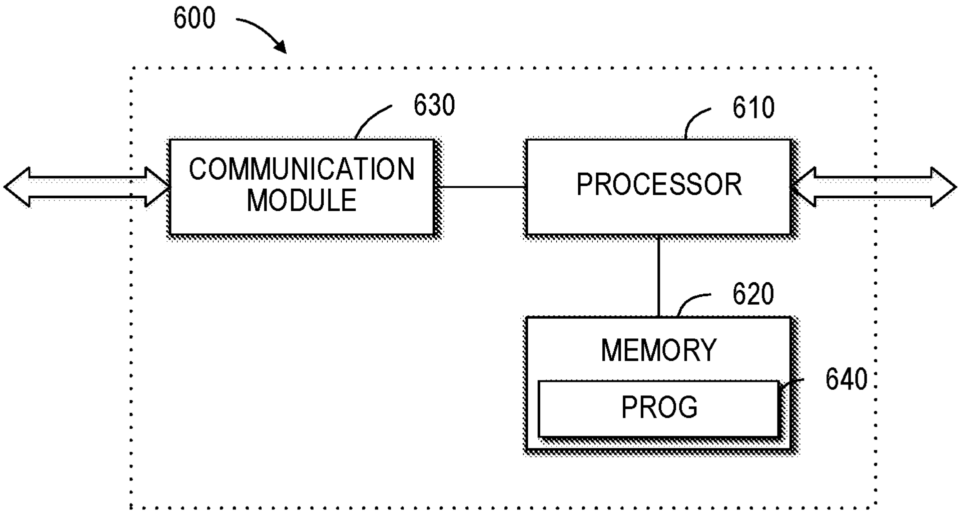
FIG. 6 is a simplified block diagram of a device that is suitable for implementing embodiments of the present disclosure.

FIG. 6 is a simplified block diagram of a device 600 that is suitable for implementing example embodiments of the present disclosure. The device 600 can be implemented at the first device 110, the second device 120 as shown in FIG. 2.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas or via a cable. The communication interface may represent any interface that is necessary for communication.

The program 640 is assumed to include program instructions that, when executed by the associated processor 610, enable the device 600 to operate in accordance with the example embodiments of the present disclosure, as discussed herein with reference to FIGS. 1 to 5. The example embodiments herein may be implemented by computer software executable by the processor 610 of the device 600, or by hardware, or by a combination of software and hardware. The processor 610 may be configured to implement various example embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 700. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the first device 110, the processor 610 may implement the operations or acts of the first device 110 as described above with reference to FIGS. 2 and 4. When the device 600 acts as the second device 120, the processor 610 may implement the operations or acts of the second device 120 as described above with reference to FIGS. 2 and 5. All operations and features as described above with reference to FIGS. 1 to 5 are likewise applicable to the device 600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the operations and acts as described above with reference to FIGS. 1 to 5. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises at least one processor; and at least one memory including computer program code; and the at least one memory and the computer program code configured to, with the at least one processor, cause the second device to upon a need for exchanging data or signaling with a third device, determine whether a location of the second device is changed; and in accordance with a determination that the location of the second device is unchanged, transmit, to a first device, in a Radio Resource Control message, a first indication that the location of the second device is unchanged.

In some aspects, a first device comprises at least one processor; and at least one memory including computer program code; the at least one memory and the computer program code configured to, with the at least one processor, cause the first device to determine a puncturing pattern for one or more segments to be transmitted, the puncturing pattern indicating at least one segment of the one or more segments for performing puncturing; perform puncturing on the one or more segments based on the puncturing pattern; and transmit the one or more segments to a second device.

In some embodiments, the puncture pattern further indicates at least one of one or more symbols, a number of samples of a symbol, a number of samples of a cyclic prefix of a symbol or a cyclic prefix of a symbol, to be punctured in a segment of the at least one segment.

In some embodiments, the puncture pattern comprises at least one of: information identifying at least one of one or more symbols, a number of samples of a symbol or a number of samples of a cyclic prefix of a symbol or a cyclic prefix of a symbol, to be punctured in a segment of the at least one segment, information identifying a subframe, a slot or a resource unit to be punctured in a segment of the at least one segment, information identifying the at least one segment for performing the puncturing, information identifying a frame, a subframe, a slot or a resource unit to start the puncturing in the at least one segment, information identifying a segment to start the puncturing in the at least one segment, or information identifying a time to start the puncturing.

In some embodiments, symbols, samples of a symbol, samples of a cyclic prefix of a symbol and/or a cyclic prefix of a symbol with different indexes are punctured in different segments of the at least one segments.

In some embodiments, the first device is caused to perform puncturing on the one or more segments by: puncturing, based on the puncturing pattern, at least a part of a symbol or at least a part of each of one or more symbols of a subframe, a slot or a resource unit in a segment of the at least one segment.

In some embodiments, the puncture pattern further indicates at least one of: puncturing one or more symbols and/or samples associated with parity bits in a segment of the at least one segment; and skipping puncturing of one or more symbols and/or samples used for a demodulation reference signal in a segment of the at least one segment.

In some embodiments, the first device is caused to determine the puncturing pattern by: receiving at least a part of the puncturing pattern from the second device over a Non-Terrestrial network.

In some embodiments, a different part of the puncturing pattern is predefined.

In some embodiments, the first device is caused to determine the puncturing pattern by: receiving, from the second device over a Non-Terrestrial network, an indication of activation of a predefined puncturing pattern of a plurality of predefined puncturing patterns; and determining the predefined puncturing pattern as the puncturing pattern for one or more segments.

In some aspects, a second device comprises at least one processor and at least one memory including computer program code; and the at least one memory and the computer program code configured to, with the at least one processor, cause the third device to receive one or more segments from a first device; determine a puncturing pattern used by the first device for puncturing at least one segment of the one or more segments; and decode the one or more segments based on the puncturing pattern.

In some embodiments, the puncture pattern further indicates at least one of one or more symbols, a number of samples of a symbol, a number of samples of a cyclic prefix of a symbol or a cyclic prefix of a symbol, to be punctured in a segment of the at least one segment.

In some embodiments, the puncture pattern comprises at least one of: information identifying information identifying at least one of one or more symbols, a number of samples of a symbol or a number of samples of a cyclic prefix of a symbol or a cyclic prefix of a symbol, to be punctured in a segment of the at least one segment, information identifying a subframe, a slot or a resource unit to be punctured in a segment of the at least one segment, information identifying the at least one segment for performing the puncturing, information identifying a frame, a subframe, a slot or a resource unit to start the puncturing in the at least one segment, information identifying a segment to start the puncturing in the at least one segment, or information identifying a time to start the puncturing.

In some embodiments, symbols, samples of a symbol, samples of a cyclic prefix of a symbol and/or a cyclic prefix of a symbol with different indexes are punctured in different segments of the at least one segments.

In some embodiments, the puncture pattern further indicates at least one of: puncturing one or more symbols and/or samples associated with parity bits in a segment of the at least one segment; and skipping puncturing of one or more symbols and/or samples used for a demodulation reference signal in a segment of the at least one segment.

In some embodiments, the second device is caused to determine the puncturing pattern used by the first device by: transmitting at least a part of the puncturing pattern to the first device over a Non-Terrestrial network.

In some embodiments, a different part of the puncturing pattern is predefined.

In some embodiments, the second device is caused to determine the puncturing pattern used by the first device by: transmitting, to the first device over a Non-Terrestrial network, an indication of activation of a predefined puncturing pattern of a plurality of predefined puncturing patterns; and determining the predefined puncturing pattern as the puncturing pattern used by the first device.

In some aspects, an apparatus implemented in a first device comprises: means determining a puncturing pattern for one or more segments to be transmitted, the puncturing pattern indicating at least one segment of the one or more segments for performing puncturing; means for performing puncturing on the one or more segments based on the puncturing pattern; and means for transmitting the one or more segments to a second device.

In some embodiments, the apparatus further comprises means for puncturing, based on the puncturing pattern, at least a part of a symbol or at least a part of each of one or more symbols of a subframe, a slot or a resource unit in a segment of the at least one segment.

In some embodiments, the apparatus further comprises means for receiving at least a part of the puncturing pattern from the second device over a Non-Terrestrial network.

In some embodiments, the apparatus further comprises means for receiving, from the second device over a Non-Terrestrial network, an indication of activation of a predefined puncturing pattern of a plurality of predefined puncturing patterns; and means for determining the predefined puncturing pattern as the puncturing pattern for one or more segments.

In some aspects, an apparatus implemented in a second device comprises: means for receiving one or more segments from a first device; means for determining a puncturing pattern used by the first device for puncturing at least one segment of the one or more segments; and means for decoding the one or more segments based on the puncturing pattern.

In some embodiments, the apparatus further comprises: means for transmitting at least a part of the puncturing pattern to the first device over a Non-Terrestrial network.

In some example embodiments, the apparatus further comprises: means for transmitting, to the first device over a Non-Terrestrial network, an indication of activation of a predefined puncturing pattern of a plurality of predefined puncturing patterns; and means for determining the predefined puncturing pattern as the puncturing pattern used by the first device.

In some aspects, a computer-readable storage medium having instructions stored thereon, the instructions, when executed on at least one processor, cause the least one processor to perform the steps of the preceding aspects.

What is claimed is:

1. A first device configured as a user equipment for uplink transmission in a non-terrestrial network, comprising:

at least one processor; and at least one memory storing computer program code which, when executed by the at least one processor, causes the first device to:

divide an uplink transmission comprising repeated physical uplink shared channel transmissions into a plurality of segments, each segment comprising a plurality of orthogonal frequency division multiplexing symbols;

determine, for the plurality of segments, a puncturing pattern selected from a predefined set of puncturing patterns shared with a second device, wherein the puncturing pattern identifies a different symbol index to be punctured in different segments according to a modulo operation based on a segment index;

perform timing-advance adjustment on a per-segment basis by puncturing, in each segment indicated by the puncturing pattern, at least one symbol or a cyclic prefix portion of a symbol corresponding to the identified symbol index, wherein symbols carrying a demodulation reference signal are excluded from puncturing;

switch the punctured symbol index between successive segments such that repetition gain loss is distributed across different symbols of the uplink transmission; and cause the uplink transmission to be decoded based on the punctured plurality of segments.

2. The first device of claim 1, wherein the puncturing pattern is selected from exactly three predefined puncturing modes, the predefined puncturing modes comprising:

(a) puncturing a first symbol of a segment, (b) puncturing a last symbol of a segment, and (c) performing no puncturing of complete symbols.

3. The first device of claim 2, wherein the different symbol index to be punctured in different segments is determined by calculating a segment index modulo a number of available puncturable symbol positions within each segment.

4. The first device of claim 3, wherein performing puncturing comprises puncturing samples of a cyclic prefix of a symbol without puncturing an entire symbol when a timing-advance increment for a segment is below a predefined threshold.

5. The first device of claim 4, wherein the puncturing pattern identifies symbols associated with parity bits for puncturing while symbols carrying information bits remain unpunctured.

6. The first device of claim 5, wherein the puncturing pattern excludes symbols configured for demodulation reference signals from being punctured in every segment.

7. The first device of claim 6, wherein the puncturing pattern further identifies a segment index at which puncturing is initiated, such that one or more initial segments are transmitted without puncturing.

8. The first device of claim 7, wherein the puncturing pattern further identifies a slot index or subframe index within each segment at which puncturing is applied.

9. The first device of claim 8, wherein the predefined puncturing pattern is preconfigured by the second device and activated by a signaling indication received from the second device over the non-terrestrial network.

10. The first device of claim 9, wherein the puncturing pattern is configured such that no single symbol position is punctured more frequently than any other symbol position across the plurality of segments.

11. A method performed by a first device, the method comprising:

dividing an uplink transmission comprising repeated physical uplink shared channel transmissions into a plurality of segments, each segment comprising a plurality of orthogonal frequency division multiplexing symbols;

determining, for the plurality of segments, a puncturing pattern selected from a predefined set of puncturing patterns shared with a second device, wherein the puncturing pattern identifies a different symbol index to be punctured in different segments according to a modulo operation based on a segment index;

performing timing-advance adjustment on a per-segment basis by puncturing, in each segment indicated by the puncturing pattern, at least one symbol or a cyclic prefix portion of a symbol corresponding to the identified symbol index, wherein symbols carrying a demodulation reference signal are excluded from puncturing;

switching the punctured symbol index between successive segments such that repetition gain loss is distributed across different symbols of the uplink transmission; and causing the uplink transmission to be decoded based on the punctured plurality of segments.

12. The method of claim 11, wherein the puncturing pattern is selected from exactly three predefined puncturing modes, the predefined puncturing modes comprising:

(a) puncturing a first symbol of a segment, (b) puncturing a last symbol of a segment, and (c) performing no puncturing of complete symbols.

13. The method of claim 12, wherein the different symbol index to be punctured in different segments is determined by calculating a segment index modulo a number of available puncturable symbol positions within each segment.

14. The method of claim 13, wherein performing puncturing comprises puncturing samples of a cyclic prefix of a symbol without puncturing an entire symbol when a timing-advance increment for a segment is below a predefined threshold.

15. The method of claim 14, wherein the puncturing pattern identifies symbols associated with parity bits for puncturing while symbols carrying information bits remain unpunctured.

16. The method of claim 15, wherein the puncturing pattern excludes symbols configured for demodulation reference signals from being punctured in every segment.

17. The method of claim 16, wherein the puncturing pattern further identifies a segment index at which puncturing is initiated, such that one or more initial segments are transmitted without puncturing.

18. The method of claim 17, wherein the puncturing pattern further identifies a slot index or subframe index within each segment at which puncturing is applied.

19. The method of claim 18, wherein the predefined puncturing pattern is preconfigured by the second device and activated by a signaling indication received from the second device over the non-terrestrial network.

20. The method of claim 19, wherein the puncturing pattern is configured such that no single symbol position is punctured more frequently than any other symbol position across the plurality of segments.

* * * * *